US012072870B1

(12) United States Patent
Jacobson et al.

(10) Patent No.: US 12,072,870 B1
(45) Date of Patent: *Aug. 27, 2024

(54) CONSENSUS PROTOCOL FOR BLOCKCHAIN STRUCTURE

(71) Applicant: Two Six Labs, LLC, Arlington, VA (US)

(72) Inventors: Adam Jacobson, Washington, DC (US); Scott D. Tenaglia, Arlington, VA (US); Sean Al-Gattas, Arlington, VA (US); Kelly Weeks, Arlington, VA (US)

(73) Assignee: Two Six Labs, LLC, Arlington, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/071,816

(22) Filed: Nov. 30, 2022

Related U.S. Application Data (63) Continuation of application No. 16/787,639, filed on Feb. 11, 2020, now Pat. No. 11,520,776.

(51) Int. Cl.
  *G06F 16/27* (2019.01)
  *A63F 13/44* (2014.01)
  *A63F 13/46* (2014.01)
  *G06F 16/23* (2019.01)
  *H04L 9/06* (2006.01)
  *A63F 13/822* (2014.01)
  (Continued)

(52) U.S. Cl.
  CPC .......... *G06F 16/2379* (2019.01); *A63F 13/44* (2014.09); *A63F 13/46* (2014.09); *G06F 16/27* (2019.01); *H04L 9/0637* (2013.01); *A63F 13/822* (2014.09); *A63F 2300/61* (2013.01); *A63F 2300/638* (2013.01); *G06Q 30/0209* (2013.01); *H04L 9/50* (2022.05)

(58) Field of Classification Search
  CPC ...... G06F 16/27; G06F 16/2379; A63F 13/44; A63F 13/46; A63F 13/822; H04L 9/50
  See application file for complete search history.

(56) References Cited

U.S. PATENT DOCUMENTS

| 11,017,688 B1 | 5/2021 | Arazi | |
|---|---|---|---|
| 2011/0003627 A1* | 1/2011 | Nicely | G07F 17/3244 463/20 |
| 2017/0124812 A1* | 5/2017 | Washington | G07F 17/3269 |

(Continued)

FOREIGN PATENT DOCUMENTS

| KR | 101852077 B1 * | 4/2018 | ......... H04L 67/1061 |

*Primary Examiner* — Tarek Chbouki
(74) *Attorney, Agent, or Firm* — Armis IP Law, LLC (57) ABSTRACT

A non-monetary incentive model defines a Distributed Consensus Protocol (DCP) for a blockchain based on a proof-of-play mining approach. The non-monetary incentive model employs a gamification approach where mining efforts are recorded responsive to achievement in a gaming environment, rather than the proof-of-work or proof-of-stake approaches commonly used for blockchain valuation. The incentive model draws on a participant volition in attaining or improving a gaming achievement. The approach records gaming moves or actions undertaken by a participant playing the game, based on a seed used to instantiate the game. Upon attaining a predetermined minimum score, and at a predefined difficulty, the gaming effort is deemed to warrant a new block in the blockchain.

21 Claims, 6 Drawing Sheets

(51) Int. Cl.
*G06Q 30/0207* (2023.01)
*H04L 9/00* (2022.01)

(56) References Cited

U.S. PATENT DOCUMENTS

| | | |
|---|---|---|
| 2018/0165916 A1 | 6/2018 | Marantelli |
| 2018/0361253 A1* | 12/2018 | Grosso ................ G07F 17/3262 |
| 2019/0197831 A1* | 6/2019 | Batton .................. H04L 9/3239 |
| 2019/0213048 A1 | 7/2019 | Mason |
| 2019/0314726 A1 | 10/2019 | Masini |
| 2020/0038761 A1 | 2/2020 | Packin et al. |
| 2020/0044824 A1 | 2/2020 | Xie et al. |
| 2020/0195421 A1 | 6/2020 | Gagnon |
| 2021/0052976 A1 | 2/2021 | Anderson et al. |
| 2021/0097602 A1 | 4/2021 | Eichel et al. |
| 2021/0119785 A1 | 4/2021 | Ben-Reuven et al. |
| 2021/0174432 A1 | 6/2021 | Gonnaud et al. |
| 2021/0174972 A1 | 6/2021 | Pavlatos et al. |
| 2022/0030031 A1 | 1/2022 | Kocsis et al. |

* cited by examiner

CONSENSUS PROTOCOL FOR BLOCKCHAIN STRUCTURE

RELATED APPLICATIONS

This application is a continuation of earlier filed U.S. patent application Ser. No. 16/787,639 entitled "CONSENSUS PROTOCOL FOR BLOCKCHAIN STRUCTURE," filed on Feb. 11, 2020, the entire teachings of which are incorporated herein by this reference.

BACKGROUND

Cryptocurrency defines an electronic monetary medium backed by a number of participants, rather than a governmental sovereign as with traditional currency. Cryptocurrency provides a digital currency or digital token with a recognized value for use by members of an on-line community via a global computer network. Cryptocurrency incorporates an electronic ledger in conjunction with cryptographic protocols to ensure authenticity and non-repudiation by storing a sequence of transaction using encryption techniques to ensure that undetected changes are prevented. Encryption, typically via public-key encryption methods, imposes data manipulations that are computationally infeasible to reverse, or "hack." A blockchain is a structure that defines such an electronic ledger for implementing a digital currency or digital token such that participants accessing the blockchain may verify activities of others and may not make undetected changes to the blockchain. Blockchains thus incorporate cryptographic protocols to operate and build applications relying on a verifiable ledger on a decentralized computer platform for a set or sequence of transactions that cannot be repudiated or changed anonymously. A blockchain employs a Distributed Consensus Protocol (DCP) to bind the participants of the blockchain to a recognition of value defined therein, just as a bank statement itemizes recognized value because people trust the bank.

DCPs use challenge mechanisms of various sorts to limit how fast new blocks are added to the blockchain. Value is defined by mechanisms like proof-of-work or proof-of-stake in blocks and/or transactions added to the blockchain based on efforts or status of a miner. Other mechanisms for electronic currency/valuation may also be employed. A miner may only add a new block if they have successfully met or solved a current challenge imposed by the DCP. In Bitcoin and many related DCPs, for example, the challenge is to produce a cryptographic hash with a certain number of leading 0 bits.

SUMMARY

A non-monetary incentive model defines a Distributed Consensus Protocol (DCP) for a blockchain based on a Proof-of-Play mining approach. The non-monetary incentive model employs a gamification approach where mining efforts are recorded responsive to achievement in a gaming environment, rather than proof-of-work or proof-of-stake as commonly used for blockchain valuation. The incentive model draws on a participant volition in attaining or improving a gaming score. The approach records gaming moves or actions undertaken by a participant playing the game, based on a seed used to instantiate the game. Upon attaining a predetermined minimum score, and at a predefined difficulty, the gaming effort is deemed to warrant a new block in the blockchain. Trivial or insufficient gameplaying efforts are screened by the minimum score and difficulty. Verification is provided by the recordation of the gaming moves or actions in playing the game, as the gaming instance is repeatable using the same seed with the replayed gaming moves to generate the same score, or result.

Configurations herein are based, in part, on the observation that blockchains derive value from a DCP among many participants who recognize the value defined in the blockchain. A blockchain with too few participants or a low or non-existent recognition of value is of little use. Unfortunately, conventional approaches to blockchain technology rely on monetary incentive models such as attributing a monetary value in the form of the blockchain's currency or token to participants who produce blocks in the blockchain. Participants achieve value by demonstrating sufficient proof-of-work in solving computational challenges, or proof-of-stake in owning or controlling a large and/or old quantity of blockchain currency or tokens. Accordingly, configurations herein substantially overcome the shortcoming of conventional monetary incentive models by defining a Proof-of-Play incentive model that draws participants by a desire to achieve at a game, rather than a desire to attain monetary value.

In an electronic transaction environment, a blockchain is a verifiable electronic ledger defining a sequence of blocks containing transactions, in which the sufficiency of the electronic ledger is based on a distributed consensus protocol (DCP) common to a plurality of interconnected computing nodes. A non-monetary incentive model is based on a gamification incentive medium. A miner, player or participant invokes the incentive medium (game) for an interactive exchange, such that the gamification incentive medium is recognized by the DCP for adding transactions to the electronic ledger. Configurations discussed herein discuss a "blockchain" as the implementation of an electronic ledger and associated transactions. Alternate implementations for a cryptographically secure ledger may be employed; blockchains define a sequence of blocks and added blocks may denote new value.

Configurations herein employ a "Proof-of-Play" incentive model as an alternative to conventional proof-of-work or proof-of-stake. Gaming achievement, typically expressed as a score in the game, is sought rather than finding a challenge that satisfies a number of leading zeros, for example. The precise details of a Proof-of-Play scheme are specific to a particular game, but in general a player/miner, in launching and playing the game, directs the node to perform in a certain manner (via game inputs) on behalf of the player to generate a result, or score.

In the course of playing the game, a node computes a seed for deriving an instantiation of the incentive medium, and receives a sequence of gaming inputs, or "moves", directed to the incentive medium as the miner plays the game. The game is responsive to the sequence of inputs for generating a result based on the seed and the sequence of inputs. Upon completion of the instantiation, the node evaluates the generated result against a publication criteria for entry in the electronic ledger. If the result satisfies the publication criteria, analogous to a challenge in conventional blockchains, the node stores the seed and the sequence of inputs by creating a new block in the blockchain. The validity for publication of the block is verifiable based on a reiteration of the game using the seed and the sequence of inputs for attaining the same result.

BRIEF DESCRIPTION OF THE DRAWINGS

The foregoing and other objects, features and advantages of the invention will be apparent from the following descrip

DETAILED DESCRIPTION

In the discussion that follows, an extension of conventional proof-of-work/stake DCPs defines Proof-of-Play as an incentive model for a blockchain. Blockchains preserve information, typically itemized values, in a series of blocks and transactions covered by cryptographic operations that make it computationally infeasible to make unauthorized and/or undetectable changes to the transactions therein. Blockchains therefore define a trusted electronic ledger of transactions, analogous to a bank statement, that derives trust from cryptography rather than a bank's security and reputation. Example configurations below depict gameplaying as a non-monetary incentivization model based on playing a game, rather than monetary rewards. The gamification incentive model may be employed with any suitable game, skill exhibition or competition that is expressible in computer-received moves or steps, and that entices participants based on largely intangible "rewards" in terms of satisfaction or accomplishment at achieving in the game. Configurations herein employ TETRIS® and Minetest as a gamification medium, although any suitable exhibition of skill and/or strategy may be employed.

Conventional Distributed Consensus Protocols incentivize participation by offering a monetary reward for performing certain actions. Bitcoin, for example, currently rewards the miner of each block with 12.5 Bitcoins, which can then be spent or exchanged for other currencies. Monetary incentivization is a natural fit for cryptocurrencies, which aim to create a decentralized monetary system. For non-cryptocurrency DCP applications, however, a monetary rewards scheme is often a strong impediment to adoption, as it complicates the incentive model. Participants in such a DCP are incentivized to mine both by monetary rewards and by the intended benefits of the DCP, which may not be complementary. Miners participating purely for the monetary rewards may thus crowd out miners primarily interested in the DCP's intended use.

Configurations herein propose an alternative DCP incentive model that incentivizes mining purely with the intrinsic reward of playing a game. Instead of proof-of-work or proof-of-stake, this scheme is Proof-of-Play. Proof-of-Play complements a DCP with associated mining and verification schemes. Proof-of-Play is a modular component that can be used as the basis for new DCPs or integrated into existing protocols, therefore it can replace monetary incentive models in conventional DCPs such as used in Bitcoin.

Participants in a Proof-of-Play DCP are incentivized to mine by their desire to play the associated game on its own merits, without reference to the DCP itself. No DCP-specific rewards (such as blockchain tokens like Bitcoins) for successful block mining are thus required, eliminating via demotivation whole categories of malfeasance. Unlike proof-of-work, which mines new blocks with a probabilistically guaranteed quantity of work, or proof-of-stake, which mines new blocks with sortition weighted by quantity and quality of stake, Proof-of-Play mines new blocks with a probabilistically guaranteed quantity and quality of play.

Figure 1:
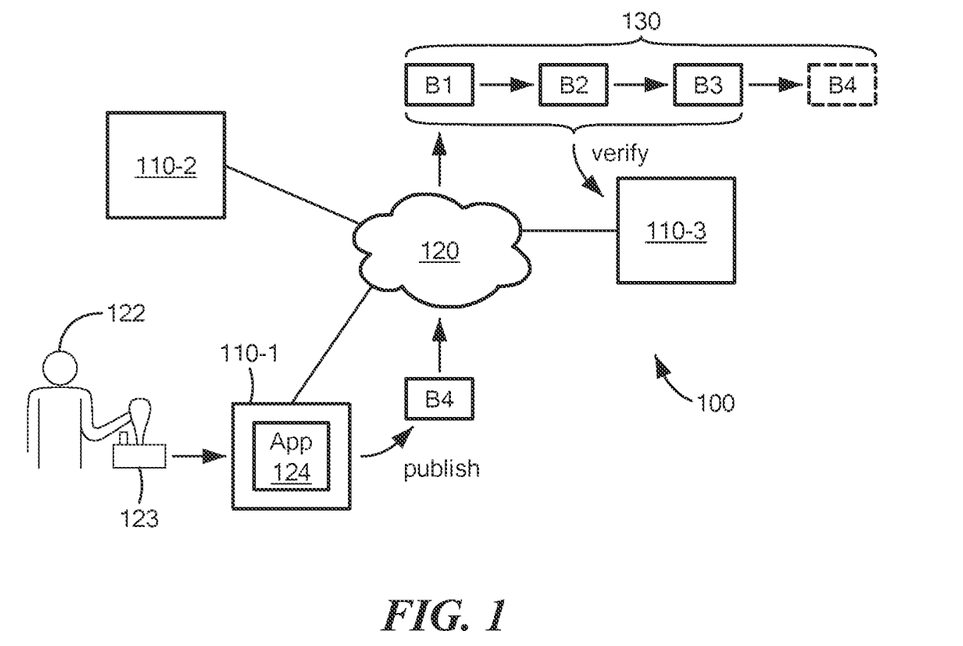
- FIG. 1 is a context diagram of a computing environment suitable for use with configurations herein.

FIG. 1 is a context diagram of a computing environment suitable for use with configurations herein. In a computing environment 100, a plurality of nodes 110-1 . . . 110-3 (110 generally) are interconnected by a public access network 120 such as the Internet. Each of the nodes includes an interface for communicating with other nodes 110 via the network 120. Consensus protocols require wide engagement to preserve security. Participants each control and/or operate at least one node in the network, and "mine" by pursuing an ability to add additional blocks to a blockchain. Conventional DCPs incentivize miners 122 with monetary rewards. Monetary rewards are incentivizing because they have a basic, almost universal, appeal. An alternate DCP incentivization model provides a means of creating large-scale permissionless distributed consensus protocols without resorting to paying participants. Configurations herein present gamification of the incentive model to replace proof-of-work with Proof-of-Play, such that miners play and thus mine for the intrinsic fun of a game, not extrinsic monetary rewards.

In a blockchain 130, a miner 122 is incentivized to "mine," or create new blocks. A blockchain application 124 launched on a node 110 under the control of the miner 122 executes for mining new blocks according to the incentivization protocol defined for the blockchain 130. In conventional approaches, this is proof-of-work or proof-of-stake as defined by the DCP corresponding to the blockchain. In the configurations discussed below, Proof-of-Play denotes mining efforts for creation of a new block.

The Proof-of-Play approach provides an alternate mining method with a novel associated incentive model for a Distributed Consensus Protocol. Proof-of-Play improves on conventional mining methods such as hash-based proof-of-work and proof-of-stake by detaching the incentive to mine from the functionality of the DCP. Participants in a Proof-of-Play DCP are incentivized to mine by their desire to play the associated game on its own merits, without reference to the DCP itself.

Proof-of-Play quantifies blockchain mining interactions in terms of gaming performance. In an example herein, Tetris serves as an appropriate gamification incentive due to its longstanding appeal, skill-based nature and single player format. Other suitable games may be employed. To add/gain value and add a new block B4, a participant launches (plays) the game via the application 124 and the controller 123, and upon sufficient achievement (defined further below), is deemed to have mined the block B4. The block B4 is added to the blockchain 130 that already includes blocks B1 . . . B3. The permissionless, distributed and verifiable properties of the blockchain preserves the mined value of the added block B4. Subsequently, node 110-3 desires to verify the contents of the blockchain 130. Verification of any of the blocks B1 . . . B4 may be performed by any of the nodes 110. The mined value denoted in B4 can be verified by any of the nodes and not undetectably altered by any of the nodes. The record of the transactions/contents of B4 do not directly accrue to the miner as 'value,' as in conventional blockchains, but rather the immutability and recognition of blockchain ambiently provides value to all its users including the miner 122.

Figure 2:
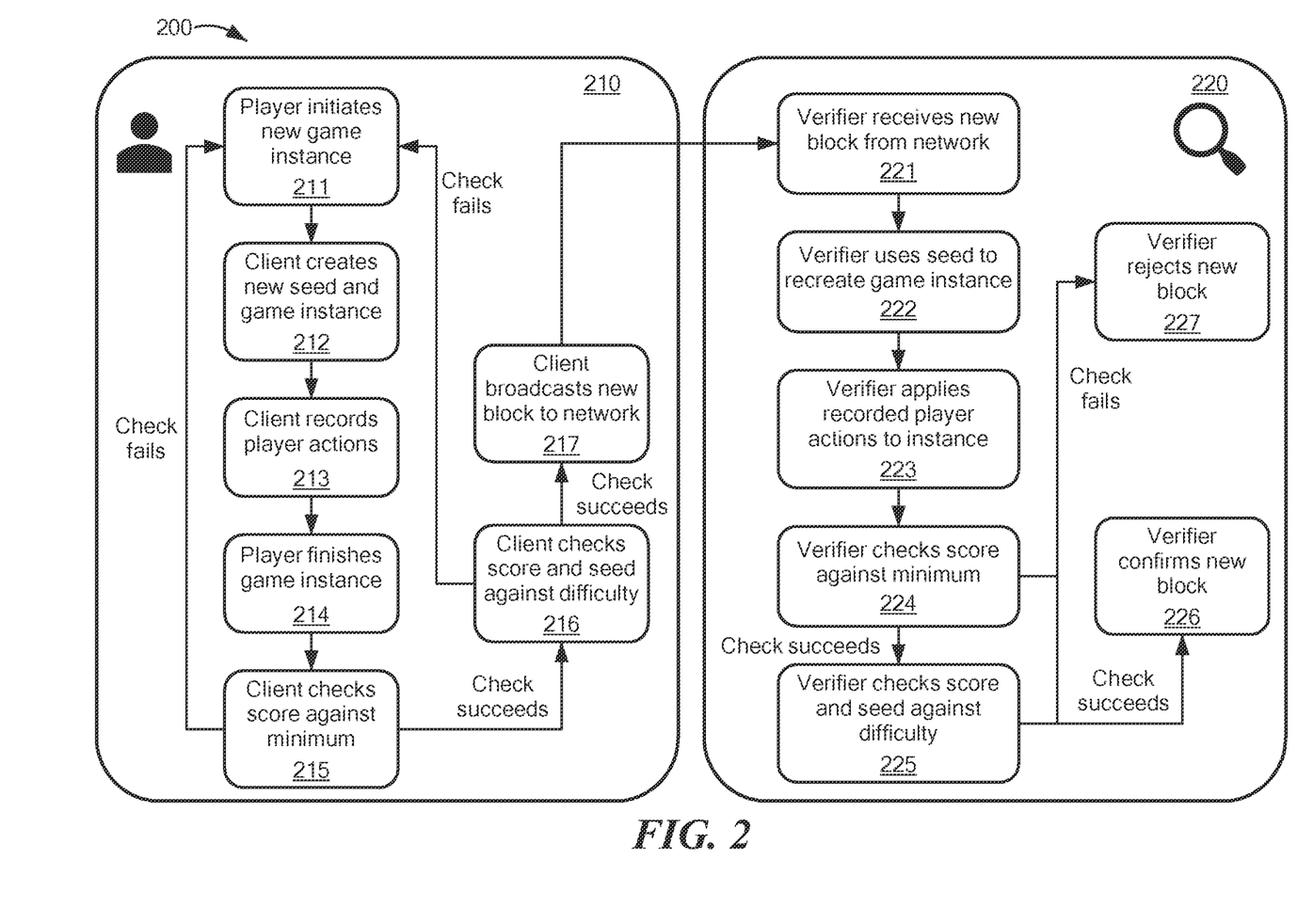
FIG. 2 shows a sequence of invoking an incentivization medium in the environment of FIG. 1.

FIG. 2 shows a sequence 200 for invoking an incentivization medium in the environment of FIG. 1. Referring to FIGS. 1 and 2, a mining sequence 210 and a verification sequence 220 are shown. A miner 122 (player) initiates a new game instance at 211 via the application 124, which operates as the blockchain client. The game instantiation is based on a seed generated for the new game instance at 212. The precise details of a Proof-of-Play scheme are specific to a particular game, but generally share three components. First, a procedural generation algorithm that takes a seed value as input and creates an instance of the game based on that seed. This algorithm should be deterministic the same seed value must always produce precisely the same instance. This requirement limits the set of games usable with Proof-of-Play to those that could or already incorporate such repeatability. Second, a gameplay log that stores all player moves during each instance of the game. Finally, a score (or similar output value) that can be derived by applying the moves or player inputs in a gameplay log to the game instance generated by the algorithm from a particular seed value.

The player plays the game and their moves/actions such as keystrokes or joystick/button manipulations are recorded at 213. Upon completion at 214, a score and log of player inputs performed to achieve the score are stored. A predetermined minimum score ensures that trivial gameplaying efforts are not rewarded with new blocks, so a check is performed against this minimum score at 215. If the score is insufficient, the player is free to play again at 211. If the score meets the predetermined minimum, a further check may be performed based on a challenge mechanism. For example, the publication criteria may also involve a hash validation (452, FIG. 4) or other challenge similar to conventional Bitcoin challenges that require a certain number of leading zeros.

DCPs use challenge mechanisms of various sorts to limit how fast new blocks are added to the blockchain. A miner may only add a new block if they have successfully met or solved a current challenge imposed by the DCP. In Bitcoin and many related DCPs, for example, the challenge is to produce a hash with a certain number of leading 0 bits. In order to ensure a constant mining rate as the size and power of the mining pool changes, many DCPs also implement a difficulty adjustment algorithm that dynamically alters the difficulty of the challenge (e.g. increasing or decreasing the number of leading 0 bits required) based on, e.g. the state of the blockchain. As a modular incentive model with defined mining and verification mechanisms, Proof-of-Play supports but does not require a challenge mechanism or difficulty adjustment algorithm. Proof-of-Play produces varied inputs to the challenge mechanism with values derived from game instances (instead of the random nonces used in Bitcoin, etc.) and gives verifiers a method for validating that miners produced their solutions through legitimate play.

In Proof-of-Play players, who need not know or care that they are participating in a DCP, independently create and play instances of the game. Depending on the selected gamification medium (e.g. Tetris), an instance may be as small as a single game action or as large as an entire session of play. In the course of play, the game nodes 110 use the Proof-of-Play scheme to generate output values as potential solutions to the current DCP challenge. This process is analogous to miners in a conventional DCP such as Bitcoin generating random nonces and checking the resulting block header hashes. If a player's instance solves the challenge, their client (node 110) then broadcasts the seed and gameplay log in the block header for a proposed new block on the blockchain 130 for verification by other nodes 110.

If the DCP incorporates a challenge mechanism that defines a difficulty for publishing a new block, the client checks the score and seed/nonce against that difficulty at 216 (the seed is derived from the nonce to provide a value in a suitable form/type as needed to instantiate the game). If the score and seed satisfy the challenge mechanism check, then the client creates a new block including the nonce and the gameplay log and propagates the new block at 217. The score does not need to be explicitly stored in the block because the score can be recreated from the seed and gameplay log.

At 220, a blockchain including the newly added block may be verified by any node 110 in the network. Verifiers verify a block (e.g. B1, B2, B3, B4, . . . ) in the blockchain by using the seed in the block header to create a matching instance of the game, applying the actions from the gameplay log in the block header to it, and confirming that the resulting output value/score meets the DCP minimum and passes the difficulty check imposed by the DCP's challenge mechanism, if any. In one configuration, by combining the game score with a challenge result, Proof-of-Play can be deployed as a modular drop-in replacement for the incentivization model and verification scheme in preexisting DCP implementations such as the Bitcoin protocol. Alternatively, the Proof-of-Play incentivization model can support a separate DCP that operates only on the achieved gaming score, discussed further below. A node 110 receives the new block B4 for verification from the network 120 at 221. The verifying node 110 recreates the game instance using the seed/nonce to instantiate the game at 222 and applies the gameplay log of inputs/moves at 223. The resulting score is checked against the predetermined minimum at 224, and if successful, the verifier checks the score and seed/nonce against the difficulty at 225 and verifies the block at 226. If either the score or the seed/nonce difficulty (hash challenge 452) checks fail, the verifying node 110 rejects the new block at 227.

Figure 3:
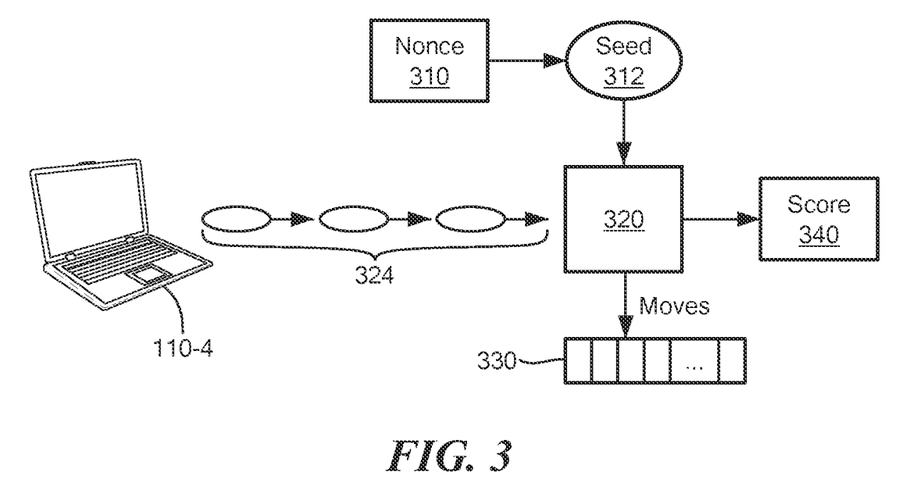
FIG. 3 shows a data and process flow of additions to an electronic ledger based on the incentivization medium of FIG. 2.

FIG. 3 shows a data and process flow of additions to an electronic ledger based on the incentivization medium of FIG. 2. Referring to FIGS. 1-3, a player/miner 122 invokes a new instance of a game (Tetris) via node 110-4. A different nonce 310 is employed to generate a seed 312 used by the game for each different instantiation. The seed is typically a value derived from at least a portion of the nonce to match the form expected by the game for initializing its randomness. A processor in the node 110-4 launches an instance 320 of Tetris. The sequence of moves or inputs 324 received by the node 110-4 on behalf of the player/miner 122 are stored in the gameplay log 330 as they are delivered to the game instance 320 during play. Upon completion, the resulting score 340 and gameplay log 330 undergo evaluation according to the publication criteria needed to qualify for entering a new block. In other words, if the gameplaying experience was not noteworthy (did not achieve at least the predetermined minimum score, and hash-based challenge if included), it will not pass the publication criteria.

Figure 4:
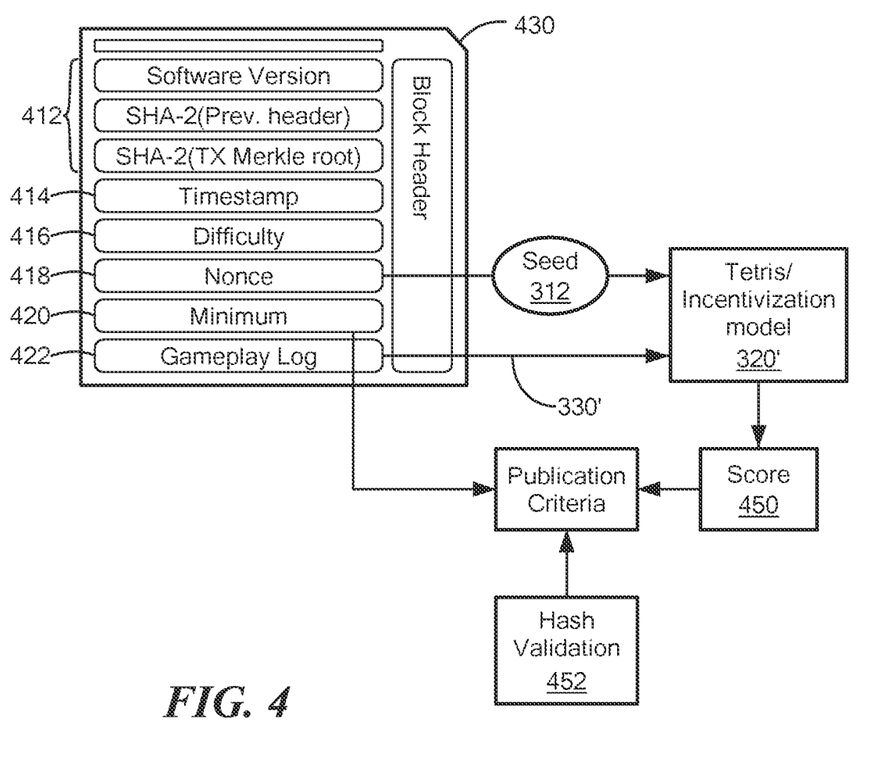
FIG. 4 shows a data and process flow of verification of blocks added to the electronic ledger as in FIG. 3.

FIG. 4 shows a data and process flow of verification of blocks added to the electronic ledger as in FIG. 3. Referring to FIGS. 1-4, the blockchain 130 includes blocks denoting a series of transactions that together form a persistent ledger protected against unauthorized and/or undetectable modification by cryptographic structures, typically based on public key signatures and secure hashes. The general notion of a blockchain provides an electronic ledger defined by blocks and transactions; various extensions on or alterations to the header structure shown in FIG. 4 may be implemented without departing from the incentivization model as defined herein. Blockchain infrastructure relies on the public key signatures for providing non-repudiation and the hashes for providing immutability and modification detection. Each block includes a header 430 including several cryptographic fields 412, a timestamp 414, a difficulty 416, nonce 418, a minimum score 420 and a gameplay log 422.

The cryptographic fields 412 along with the nonce 418, support the cryptographic infrastructure for authentication and nonrepudiation of the transactions in the blockchain. The timestamp 414 is used for ordering of added blocks because the blockchain propagation may not necessarily be sequential. In implementations where a hybrid publication criteria is employed, the difficulty 416 defines a further condition such as a number of leading zeros or other qualifier in a proposed solution in addition to the minimum score needed for publication. This can be used to make sure the gamification of the incentive model restricts excessive creation of new blocks, i.e. does not make mining too "easy." The nonce 418 is a unique or single use number supporting cryptographic operations and is also used as a random basis for seed generation. The minimum score 420 is a value that the miner/player need achieve in Tetris or other selected incentive medium to qualify to produce a new block. The stored gameplay log 422 is the verification copy of the series of moves or inputs stored from the gameplay log 330.

For verification, the nonce 418 is used to derive the seed 312, and the stored gameplay log 422 is applied to a non-interactive instantiation 320' of the game. If the resulting score and/or other outputs meets the publication criteria (score minimum and/or difficulty), the block is deemed valid.

Figure 5A:
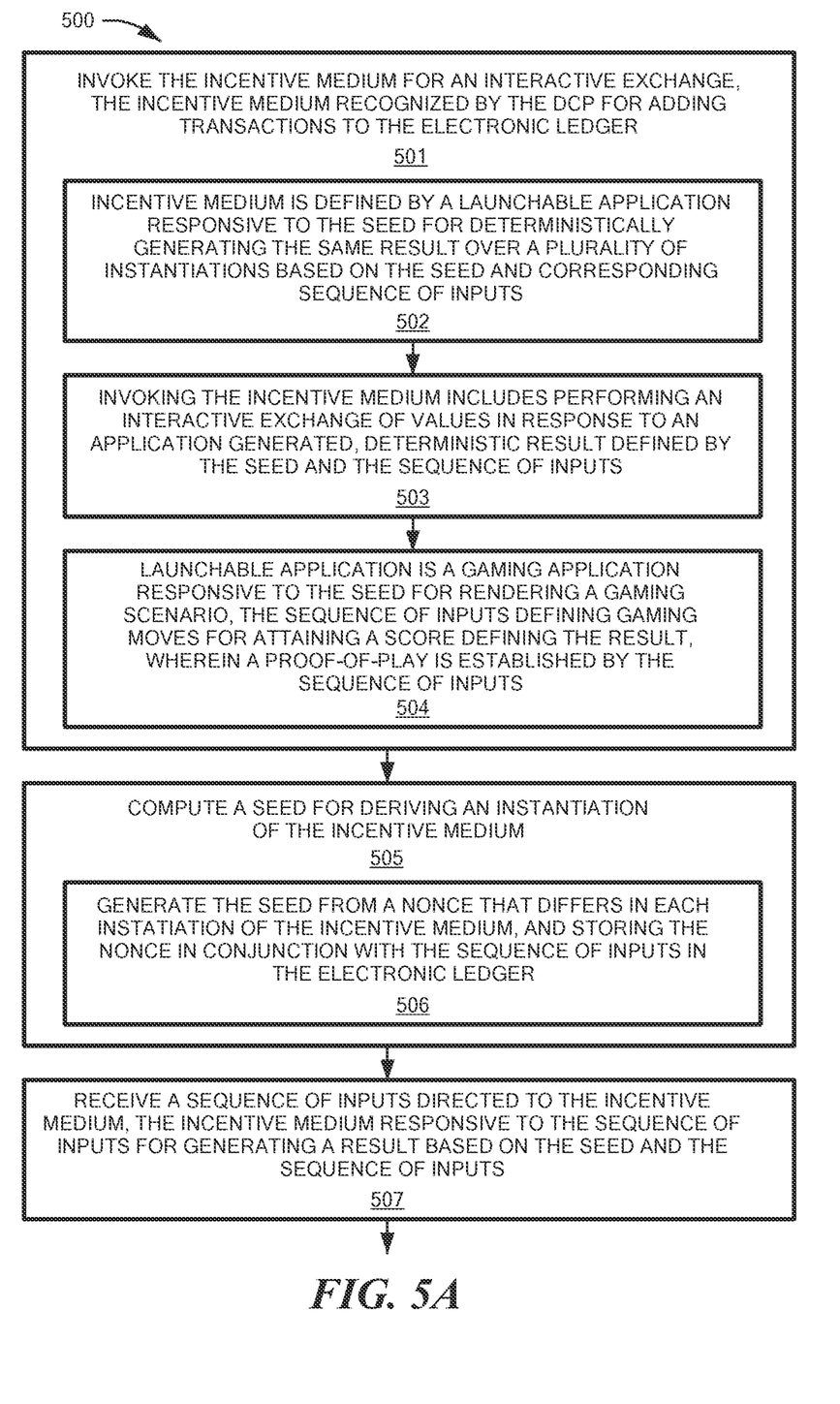
FIGS. 5A-5C show a flowchart of electronic ledger propagation using the incentivization medium as in FIGS. 1-4.
Figure 5B:
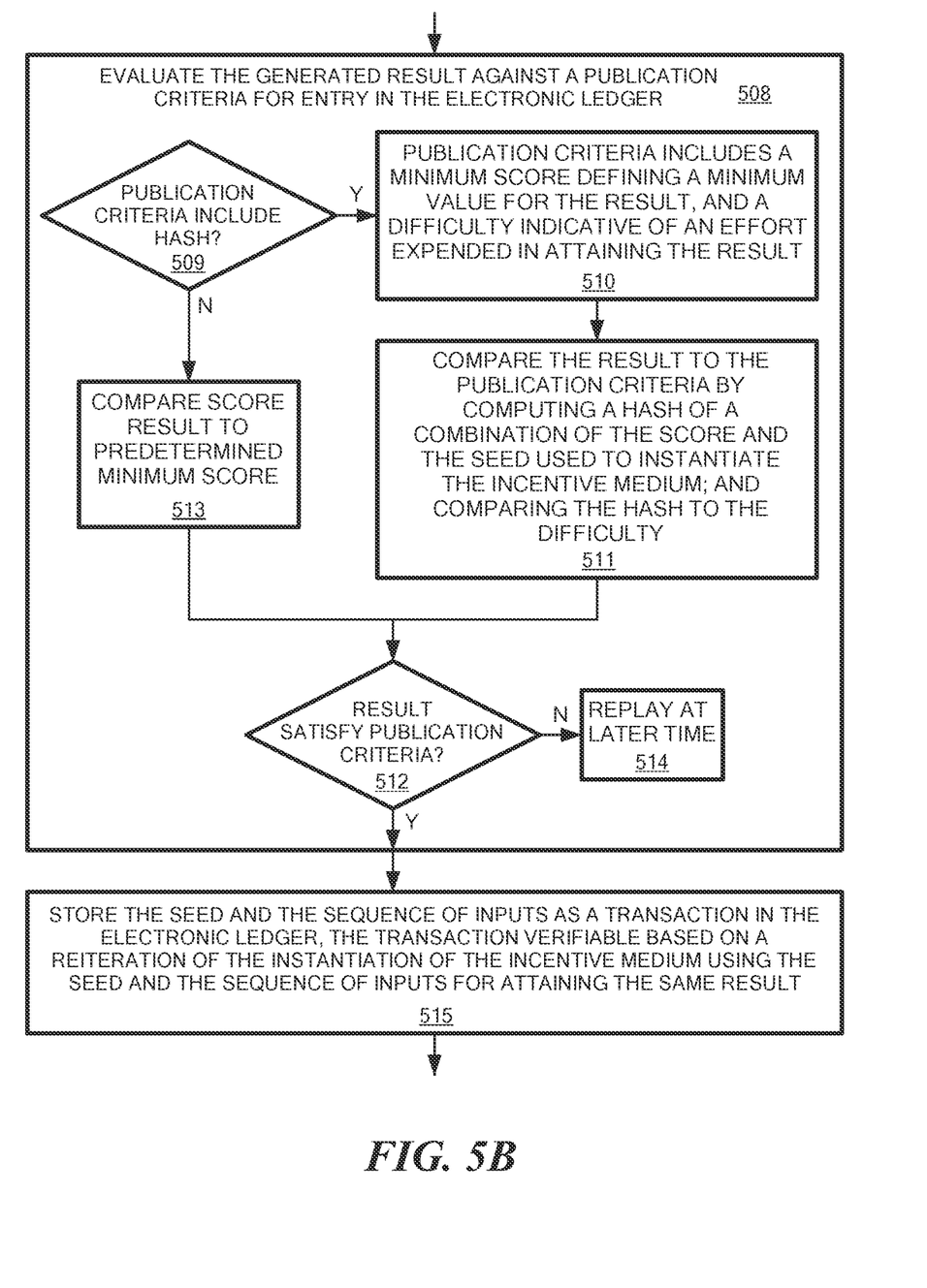
Figure 5C:
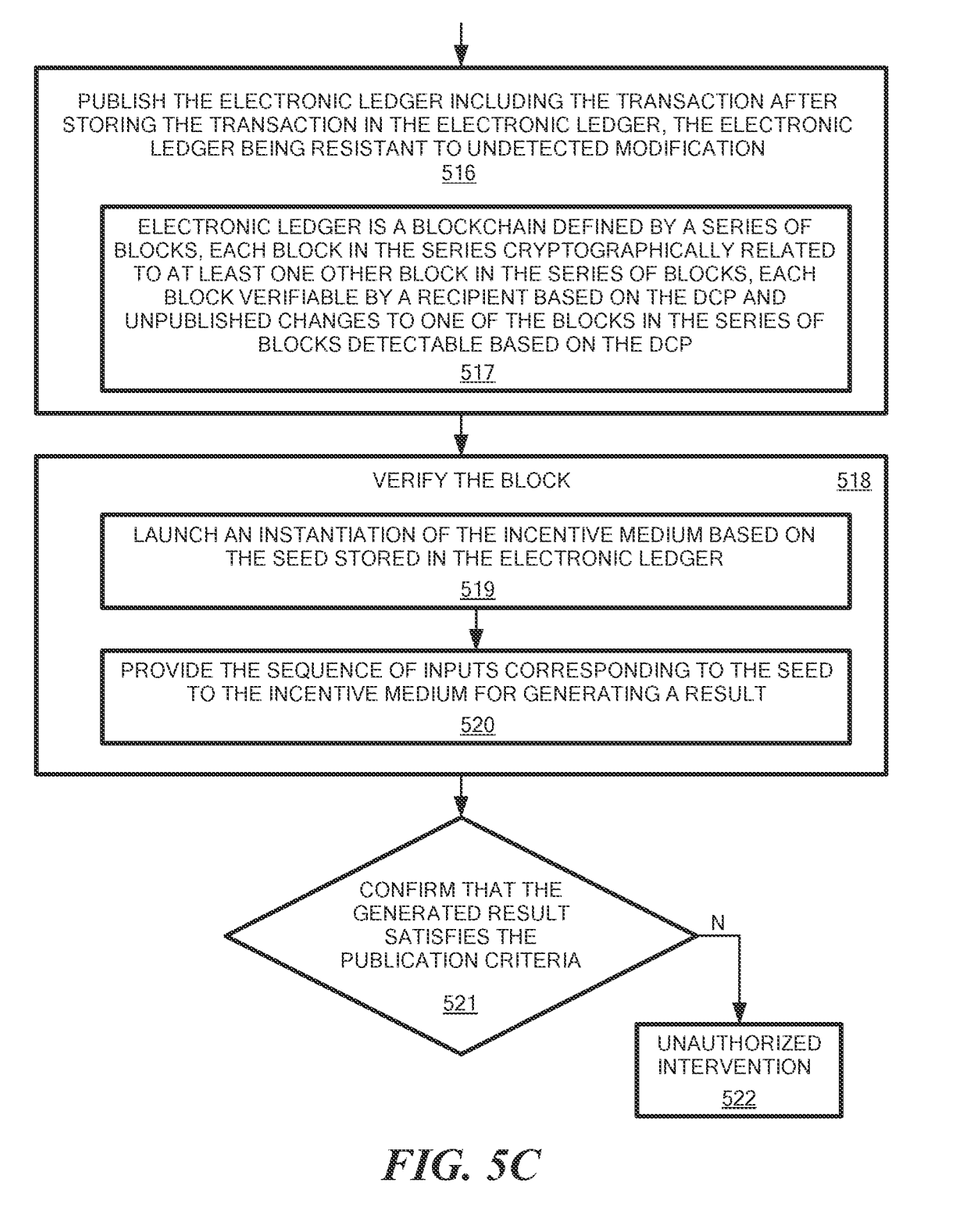

FIGS. 5A-5C show a flowchart 500 of electronic ledger propagation using the incentivization medium as in FIGS. 1-4. Referring to FIGS. 1-5C, in the computing environment 100 having a verifiable electronic ledger such as the blockchain 130 defining a sequence of transactions, an incentive model is based on an incentive medium. Reliance on the unmodifiable nature of the electronic ledger is based on a distributed consensus protocol (DCP) common to a plurality of interconnected computing nodes 110. In other words, users "trust" the DCP much as conventional currency is based on a trust in the nation that issued it.

To commence a mining session or effort, a miner (player or participant) invokes the incentive medium for an interactive exchange, in which the incentive medium is recognized by the DCP for adding blocks of transactions to the electronic ledger, depicted at step 501. The incentive medium is defined by a launchable application responsive to the seed 312 for deterministically generating the same result over any number of instantiations based on the seed and corresponding sequence of inputs defined in the gameplay log 330, as disclosed at step 502. The example incentive medium is an instantiation 320 of a game such as Tetris. Invoking the incentive medium includes performing an interactive exchange of values in response to an application generated, deterministic result defined by the seed and the sequence of inputs, depicted at step 503. The incentive medium may be satisfied by a launchable application, typically expressed as an executable file, for rendering an instantiation of the launched application for invoking the seed for generating a deterministic instantiation. This means that the same sequence and timing of inputs provided to a gaming instantiation with the same seed will produce the same score (result). The example interactive exchange includes the gaming mechanics of Tetris (other gamification approaches could be employed), defined by keystrokes and/or joystick inputs for rotating a falling object according to precise timing to achieve a well-defined agglomeration of shapes. In the example shown, therefore, the launchable application is a gaming application responsive to the seed for rendering a gaming scenario, in which the sequence of inputs define gaming moves for attaining a score defining the result, wherein a Proof-of-Play is established by the sequence of inputs recorded in the gameplay log 330, as shown at step 504. Gamification of the incentive medium is beneficial because an interactive gaming application is quantitatively responsive to a timing and substance of the inputs in the sequence of inputs for increasing a score value defining the result.

The client or host defined by the node 110 computes a seed for deriving an instantiation of the incentive medium, as depicted at step 505. This includes generating the seed 312 from a nonce 310 that differs in each instantiation of the incentive medium and storing the nonce in conjunction with the sequence of inputs in the electronic ledger to allow replay and verification, as shown at step 506. In a typical blockchain implementation, the nonce and log are stored in a new block which is only added to the blockchain (the electronic ledger) when it is published and verified. As used herein, the nonce is an absolutely random value picked independently by the client within the constraints of use and form as defined by the DCP. The nonce may therefore be derived by a blockchain infrastructure or application such as that employed in Bitcoin. Alternatively, other blockchain architectures or approaches may be employed to derive a seed via alternate mechanisms. In simplest terms, the seed is a random value that determines the course of play for generating different gaming scenarios, but the same seed will generate (repeat) the same game.

Once launched, during interactive gameplay, the node 110 receives a sequence of inputs directed to the incentive medium, such that the incentive medium is responsive to the sequence of inputs for generating a result based on the seed and the sequence of inputs, as depicted at step 507. The gaming application responds to the user's inputs or "moves" according to the game dynamics, which often require skill, dexterity and timing which contribute to the value and enjoyment of Proof-of-Play.

Upon game completion, a score results, and the node 110 evaluates the generated result against publication criteria for entry in the electronic ledger, as disclosed at step 508. Blockchain entries derive a value from an effort, challenge or difficulty in creating new blocks. This may include the resulting score alone, or may include a challenge combined with the score, to regulate and "throttle" the ease with which new blocks may be created. Use of a challenge also facilitates the use of Proof-of-Play with existing blockchain mechanisms which employ a challenge as part of their infrastructure. If, at step 509, the publication criteria includes a hash based challenge defined as the hash validation 452, then the publication criteria includes a minimum score defining a minimum value for the result, and a difficulty indicative of an effort expended in attaining the result, as depicted at step 510.

Evaluation includes comparing the result to the publication criteria by computing a hash of a combination of the score and the seed used to instantiate the incentive medium and comparing the hash to the difficulty (if called for), as depicted at step 511. An illustration depicting a Tetris-based challenge may be as follows:

1. Miners play Tetris, seeding the game with SHA-256 (block header), where 'SHA-256' denotes the application of the standardized cryptographic hash of that name and changing nonce (within the block header) between games to give each game a unique seed.
    a. Miners keep a gameplay log of all player actions during the game.
2. At the end of the game, if
    (score>minimum and SHA-256(score||seed)<difficulty), where '||' denotes concatenation
    insert gameplay log into the block header and broadcast the new block for verification.
3. Nodes 110 accept and propagate new blocks if they pass verification. Verification is performed as follows:
    a. Calculate seed=SHA-256(block header) and instantiate a Tetris game with seed.
    b. Perform a "play-through" following the gameplay log to confirm score>minimum.
    c. Confirm SHA-256(score||seed)<difficulty.

Note again that in Proof-of-Play there is no monetary reward for successful miners—miners mine because they enjoy playing Tetris on its own merits and their playing of Tetris thus powers the mining process. The example given here is adapted for integration with a Bitcoin blockchain infrastructure and employs the Bitcoin block header structure, but Proof-of-Play is a drop-in replacement for proof-of-work and can be used in any proof-of-work-based system Proof-of-Play is agnostic as to the types of transactions and overall structure of the DCP it powers. Finally, recall that in the block header of FIG. 4, the difficulty may emanate from a Bitcoin implementation and is a dynamic value that controls how often the network produces a new block whereas the minimum is a fixed value added to support Proof-of-Play in Tetris. The difficulty defines a predetermined number of leading zeros and the computed hash has a number of leading zeros for comparison, such that the comparison matches when the hash has at least as many leading zeros as the difficulty.

Alternatively, at step 513, if the publication criteria includes only the achieved Tetris score, and not the hash validation 452, then the node 110 compares the result to the predetermined minimum score 420. A check is performed, at step 512, to determine if the result satisfies the publication criteria, as shown at step 512. If not, the miner may return to play another time, as disclosed at step 514.

If the publication criteria is satisfied, a new block is published by storing the seed and the sequence of inputs in the block and then appending the block to the electronic ledger, such that the publication is verifiable based on a reiteration of the instantiation of the incentive medium using the seed and the sequence of inputs for attaining the same result, as depicted at step 515.

The node 110 publishes the new block in the electronic ledger that is the blockchain 130 after storing the new block in the electronic ledger, as depicted at step 516. This renders the electronic ledger resistant to undetected modification. The electronic ledger is a blockchain 130 defined by a series of blocks, in which each block in the series is cryptographically related to at least one other block in the series of blocks, and each block is verifiable by a recipient based on the DCP, as shown at step 517. Any unpublished changes to one of the blocks in the series of blocks would be detectable based on the DCP.

Subsequently, as the blockchain 130 propagates around nodes 110 in the network 120, nodes may invoke a verification of the newly added block, as disclosed at step 518. The verifying node 110 launches an instantiation of the incentive medium based on the seed stored in relevant block in the electronic ledger, as depicted at step 519, and provides the sequence of inputs corresponding to the seed to the incentive medium for generating a result using the published sequence of inputs 330.' The node confirms that the generated result satisfies the publication criteria, as depicted at step 521. The verification will complete because the seed combined with the moves from the sequence of inputs 330' will produce the same score that previously satisfied the minimum, and the nonce will result in the same hash (if employed) that was used for publication at step 511. If the verification does not pass, then an unauthorized intervention or breach is suspected, as shown at step 522.

Another gamification configuration employs Minetest as the incentivization medium. Minetest is an open-source highly-modifiable reimplementation of the popular game MINECRAFT®. In Minetest, players can create and run their own servers via P2P networking. It is multiplayer, deterministic, and adaptable to the blockchain. The game world is procedurally generated from a seed value via a deterministic algorithm, and each "chunk" of the world is generated from just its X, Y location and the world seed. Minetest is also widely accessible on a variety of platforms for a large potential player base, and has a strong following, as people want to play and enjoy playing the game of their own volition.

Minetest players either start their own servers to host worlds or play as clients of existing servers. In a given Minetest world, when a new chunk (gaming unit or element) is generated (e.g. as a result of player exploration), the server hashes the chunk. Alternatively, the chunk can be hashed when it is modified by a player (e.g. by the addition of new Minetest blocks). If a chunk hash is less than the current difficulty, the server has successfully mined and broadcasts the new block to the network, adding its world seed and chunk location to the block header, similar to the block header 430 in FIG. 4, above. The network verifies the new block by using the published world seed and chunk location to independently generate the chunk and check its hash.

Those skilled in the art should readily appreciate that the programs and methods defined herein are deliverable to a user processing and rendering device in many forms, including but not limited to a) information permanently stored on non-writeable storage media such as ROM devices, b) information alterably stored on writeable non-transitory storage media such as floppy disks, magnetic tapes, CDs, RAM devices, and other magnetic and optical media, or c) information conveyed to a computer through communication media, as in an electronic network such as the Internet or telephone modem lines. The operations and methods may be implemented in a software executable object or as a set of encoded instructions for execution by a processor responsive to the instructions. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. In an electronic transaction environment having a verifiable electronic ledger, the sufficiency of the electronic ledger based on a distributed consensus protocol (DCP) common to a plurality of interconnected computing nodes, a method of implementing an incentive model based on an incentive medium, comprising:
   receiving a sequence of inputs directed to an incentive medium defined by a gamification instantiation based on a seed, the incentive medium responsive to the sequence of inputs for generating a result defined by a scored performance based on the sequence of inputs through execution of an interactive gaming instantiation based on the seed;
   evaluating the generated result against a publication criteria for entry in an electronic ledger, the publication criteria based on a gamification performance and a difficulty indicative of an effort expended in attaining the result; and,
   if the result satisfies the publication criteria,
      storing the seed and the sequence of inputs as a verifiable block in the electronic ledger.

2. The method of claim 1 further comprising verifying the block by:
   launching an instantiation of the incentive medium based on the seed stored in the electronic ledger;
   providing the sequence of inputs corresponding to the seed to the incentive medium for generating a result; and
   confirming that the generated result satisfies the publication criteria.

3. The method of claim 2 further comprising generating the seed from a nonce that differs in each instantiation of the incentive medium, and storing the nonce in conjunction with the sequence of inputs in the electronic ledger.

4. The method of claim 1 wherein the incentive medium is defined by a launchable application responsive to the seed for deterministically generating the same result over a plurality of instantiations based on the seed and corresponding sequence of inputs.

5. The method of claim 1 wherein invoking the incentive medium includes performing an interactive exchange of values in response to an application generated, deterministic result defined by the seed and the sequence of inputs.

6. The method of claim 5 wherein the incentive medium is a launchable application for rendering an instantiation of the launched application invoking the seed for generating a deterministic instantiation.

7. The method of claim 6 wherein the launchable application is a gaming application responsive to the seed for rendering a gaming scenario, the sequence of inputs defining gaming moves for attaining a score defining the result, wherein a proof-of-play is established by the sequence of inputs.

8. The method of claim 1 wherein the incentive medium is an interactive gaming application, the interactive gaming application qualitatively responsive to a timing and substance of the inputs in the sequence of inputs for determining a score value defining the result.

9. The method of claim 1 further comprising publishing the electronic ledger including the block after storing the block in the electronic ledger, the electronic ledger being resistant to undetected modification.

10. The method of claim 9 wherein the electronic ledger is a blockchain defined by a series of blocks, each block in the series cryptographically related to at least one other block in the series of blocks, each block verifiable by a recipient based on the DCP and published or unpublished changes to one of the blocks in the series of blocks detectable based on the DCP.

11. The method of claim 1 further comprising comparing the result to the publication criteria by computing a hash of a combination of the score and the seed used to instantiate the incentive medium; and comparing the hash to the difficulty.

12. The method of claim 11 wherein the difficulty defines a predetermined number of leading zeros and the computed hash has a number of leading zeros for comparison, the comparison matching when the hash has at least as many leading zeros as the difficulty.

13. The method of claim 1, further comprising receiving the sequence of inputs resulting from interactive gaming inputs or moves directed towards an executable entity defining the incentive medium, the publication criteria defined by achievement of a predetermined score resulting from the gaming inputs or moves.

14. In an electronic transaction environment having a verifiable electronic ledger, the sufficiency of the electronic ledger based on a distributed consensus protocol (DCP) common to a plurality of interconnected computing nodes, a method of implementing an incentive model based on an incentive medium, comprising:
   receiving a sequence of inputs directed to an incentive medium defined by a gamification instantiation based on a seed, the incentive medium responsive to the sequence of inputs for generating a result based on the sequence of inputs;
   evaluating the generated result against a publication criteria for entry in an electronic ledger, the publication criteria based on a gamification performance and a difficulty indicative of an effort expended in attaining the result, and,
   if the result satisfies the publication criteria,
   storing the seed and the sequence of inputs as a verifiable block in the electronic ledger, attaining the performance criteria resulting in storing the seed and corresponding sequence of inputs as a block in the electronic ledger, the block verifiable based on a reiteration of the instantiation of the incentive medium using the seed and the sequence of inputs to attain the same result.

15. A proof-of-play blockchain structure, comprising:
   a verifiable electronic ledger defining a sequence of blocks each having a header, the sufficiency of the electronic ledger based on a distributed consensus protocol (DCP);
   a nonce in the header for varying gamification instantiations of an incentive medium based on a seed;
   a sequence of inputs in the header, the sequence of inputs provided to the incentive medium in a gamification instantiation based on the nonce;
   a publication criteria indicative of a result to be achieved with an instantiation of the incentive medium in order to add a new block to the ledger, the minimum result based on a gamification performance,
   the incentive medium responsive to the sequence of inputs for generating the result, the result defined by a scored performance based on the sequence of inputs through execution of an interactive gaming instantiation based on the seed.

16. The blockchain structure of claim 15, further comprising a reward metric for encouraging participation by the computing nodes based on an interactive game launchable on the interconnected computing nodes, the interactive game defined by an executable computer file.

17. The blockchain structure of claim 15, further comprising:
a created block for addition to the blockchain;
a verification node responsive to the created block, the verification node for launching an instantiation of the incentive medium based on the seed stored in the electronic ledger, providing the sequence of inputs corresponding to the seed to the incentive medium for generating a result, and confirming that the generated result satisfies the publication criteria.

18. The blockchain structure of claim 17 wherein the blockchain is defined by a series of blocks, each block in the series cryptographically related to at least one other block in the series of blocks, each block verifiable by a verification node based on the DCP and unpublished changes to one of the blocks in the series of blocks detectable based on the DCP.

19. The blockchain structure of claim 15 wherein the incentive medium is a launchable application for rendering an instantiation of the launched application invoking the seed for generating a deterministic instantiation.

20. The blockchain structure of claim 19 wherein the launchable application is a gaming application responsive to the seed for rendering a gaming scenario, the sequence of inputs defining gaming moves for attaining a score defining the result, wherein a proof-of-play is established by the sequence of inputs.

21. A computer program embodying program code on a non-transitory medium that, when executed by a processor, performs steps for implementing a method of implementing an incentive model for a distributed consensus protocol (DCP) common to a plurality of interconnected computing nodes based on an incentive medium, the method comprising:
receiving a sequence of inputs directed to an incentive medium defined by a gamification instantiation based on a seed, the incentive medium responsive to the sequence of inputs for generating a result defined by a scored performance based on the sequence of inputs through execution of an interactive gaming instantiation based on the seed;
evaluating the generated result against a publication criteria for entry in an electronic ledger, the publication criteria based on a gamification performance, and a difficulty indicative of an effort expended in attaining the result; and,
if the result satisfies the publication criteria,
storing the seed and the sequence of inputs as a verifiable block in the electronic ledger.

* * * * *